United States Patent
Landis

(10) Patent No.: US 11,932,337 B2
(45) Date of Patent: Mar. 19, 2024

(54) LOCKING DEVICE AND METHOD FOR LOCKING A BICYCLE THEREWITH

(71) Applicant: Purdue Research Foundation, West Lafayette, IN (US)

(72) Inventor: Clayton S. Landis, South Bend, IN (US)

(73) Assignee: Purdue Research Foundation, West Lafayette, IN (US)

( * ) Notice: Subject to any disclaimer, the term of this patent is extended or adjusted under 35 U.S.C. 154(b) by 369 days.

(21) Appl. No.: 17/391,173

(22) Filed: Aug. 2, 2021

(65) Prior Publication Data

US 2022/0033021 A1    Feb. 3, 2022

Related U.S. Application Data

(60) Provisional application No. 63/060,304, filed on Aug. 3, 2020.

(51) Int. Cl.
| | |
|---|---|
| *B62H 5/20* | (2006.01) |
| *B62H 5/00* | (2006.01) |
| *G05B 15/02* | (2006.01) |
| *G07C 9/00* | (2020.01) |
| *E05B 73/00* | (2006.01) |
| *G01S 19/16* | (2010.01) |

(52) U.S. Cl.
CPC ............... *B62H 5/003* (2013.01); *B62H 5/20* (2013.01); *G05B 15/02* (2013.01); *G06Q 50/40* (2024.01); *G07C 9/00571* (2013.01); *E05B 73/0011* (2013.01); *G01S 19/16* (2013.01); *G06Q 2240/00* (2013.01)

(58) Field of Classification Search
CPC ............. E05B 73/0011; E05B 73/0029; E05B 73/0005; E05B 73/0017; E05B 45/005; E05B 69/006; E05B 67/28; E05B 67/003; E05B 67/006; B62H 3/00; B62H 5/003; B62H 5/20; A47F 10/04; A47F 7/024; G05B 15/02; G06Q 50/30; G06Q 2240/00; G07C 9/00571; G01S 19/16
USPC .................................................... 70/57.1, 233
See application file for complete search history.

(56) References Cited

U.S. PATENT DOCUMENTS 10,577,834 B1 *  3/2020  Luedtke ................... B62H 5/08

FOREIGN PATENT DOCUMENTS

| | | | | |
|---|---|---|---|---|
| GB | 2582535 A | * | 9/2020 | ............... B62H 5/20 |
| WO | WO-2022190094 A1 | * | 9/2022 | |

* cited by examiner

*Primary Examiner* — Suzanne L Barrett
(74) *Attorney, Agent, or Firm* — Hartman Global IP Law; Gary M. Hartman; Domenica N. S. Hartman

(57) ABSTRACT

A locking device includes a lock body configured to be secured to a part of a bicycle, a cable within the lock body and having a first end accessible from an exterior of the lock body, a spring coil mechanism within the lock body for coiling the cable within the lock body and enabling the cable to be selectively extended from the lock body to lock the bicycle to a separate structure by wrapping the cable around the separate structure and then locking the first end of the cable to the lock body, and a communication and control unit incorporated into the lock body and configured to communicate with a remote device to allow the remote device to wirelessly unlock the first end of the cable from the lock body.

18 Claims, 9 Drawing Sheets

LOCKING DEVICE AND METHOD FOR LOCKING A BICYCLE THEREWITH

CROSS REFERENCE TO RELATED APPLICATIONS

This application claims the benefit of U.S. Provisional Application No. 63/060,304, filed Aug. 3, 2020, the contents of which are incorporated herein by reference.

BACKGROUND OF THE INVENTION

The present invention generally relates to devices for securing personal transportation equipment, including bicycles, and in certain embodiments allow for remote sharing of the transportation equipment.

To prevent unauthorized use, bicycles are commonly secured to separate structures, including less mobile structures such as bicycle racks, with cables and portable locks (e.g., a keyed padlock, combination padlock, etc.). Such a cable is typically wrapped around a part of the bicycle as well as a part of the separate structure. Loops on ends of the cable were then secured to one another with the lock. More recently, bicycle locking options have expanded into new technologies such as those that allow for keyless operation, as examples, biometric locks and "smart locks" (which as used herein refers to locks that are configured to wirelessly communicate and be operated by a remote device such as a smart phone). However, despite an increase in locking options, bicycle theft continues to be an ongoing concern. For example, some estimates indicate that a bicycle is stolen in the United States every ten seconds.

Bicycle sharing programs are a type of transportation service in which bicycles are provided for shared use on a short term basis. Many bicycle sharing programs allow riders to borrow a bicycle from a lockable bicycle rack (commonly referred to as a "dock") to be returned to the same or another dock at a later time. Alternatively, some bicycle sharing programs utilize self-locking bicycles and do not require docks. Modern bicycle sharing programs may include computerized activation and payment, either at the dock or via a system integrated into the bicycle. Due to their convenience and relatively low cost to riders, bicycle sharing programs have seen significant worldwide growth in recent years. For example, it is estimated that bicycle sharing ridership in the United States has grown 25% every year since 2010.

While bicycle sharing programs are rapidly innovating, there are still several drawbacks. For example, dock-based programs include a limited number of docks and therefore require riders to go to specific locations to obtain and return bicycles. This may be inconvenient for the rider and may require the program staff to redistribute bicycles between the docks to maintain a widespread inventory. Dockless programs may require the riders to return the bicycles to certain designated locations, in which case such programs suffer from similar shortcomings as the dock-based programs. Alternatively, certain dockless programs allow the riders to leave the bicycles in any location or within a relatively broad geographic boundary. Such programs have received criticism from communities due to riders leaving the bicycles in locations that are on private property, block pedestrian or vehicle traffic, and/or are considered to negatively affect community aesthetics. In addition, current bicycle sharing programs often require significant initial investment (e.g., docks, specialized bicycles, proprietary computer software, etc.) which may act as a barrier to entry into the market and may limit the growth and success of the programs.

In view of the above, it can be appreciated that there are certain problems, shortcomings or disadvantages associated with the prior art, and that it would be desirable if systems and methods were available for securing and/or sharing bicycles that were capable of at least partly overcoming or avoiding these problems, shortcomings or disadvantages.

BRIEF DESCRIPTION OF THE INVENTION

The present invention provides devices for locking bicycles to separate structures and methods for remotely unlocking the bicycles. In certain embodiments, the devices and methods allow for remote sharing of the bicycles.

According to one aspect of the invention, a locking device includes a lock body configured to be secured to a part of a bicycle, a cable within the lock body and having a first end accessible from an exterior of the lock body, and a spring coil mechanism within the lock body for coiling the cable within the lock body and enabling the cable to be selectively extended from the lock body to lock the bicycle to a separate structure by wrapping the cable around the separate structure and then locking the first end of the cable to the lock body. A communication and control unit is incorporated into the lock body and configured to communicate with a remote device to allow the remote device to wirelessly unlock the first end of the cable from the lock body.

According to another aspect of the invention, a method for locking a bicycle includes securing a lock body of a locking device on a part of the bicycle, pulling on a first end of a cable accessible from an exterior of the lock body in a direction away from the lock body to uncoil a portion of the cable from a spring coil mechanism within the lock body and extend the portion of the cable from the lock body, locking the bicycle to a separate structure by wrapping the cable around the separate structure and then locking the first end of the cable to the lock body, and wirelessly unlocking the first end of the cable to unlock the bicycle from the separate structure.

Technical aspects of a locking device comprising elements as described above include its ability to securely lock a bicycle to a separate structure, such as a bicycle rack. An optional feature of the locking device is the ability to facilitate sharing of a bicycle within a community. For this purpose, the communication and control unit incorporated into the lock body can be used to remotely unlock the bicycle from the separate structure.

Other aspects and advantages of this invention will be appreciated from the following detailed description.

DETAILED DESCRIPTION OF THE INVENTION

Figure 1:
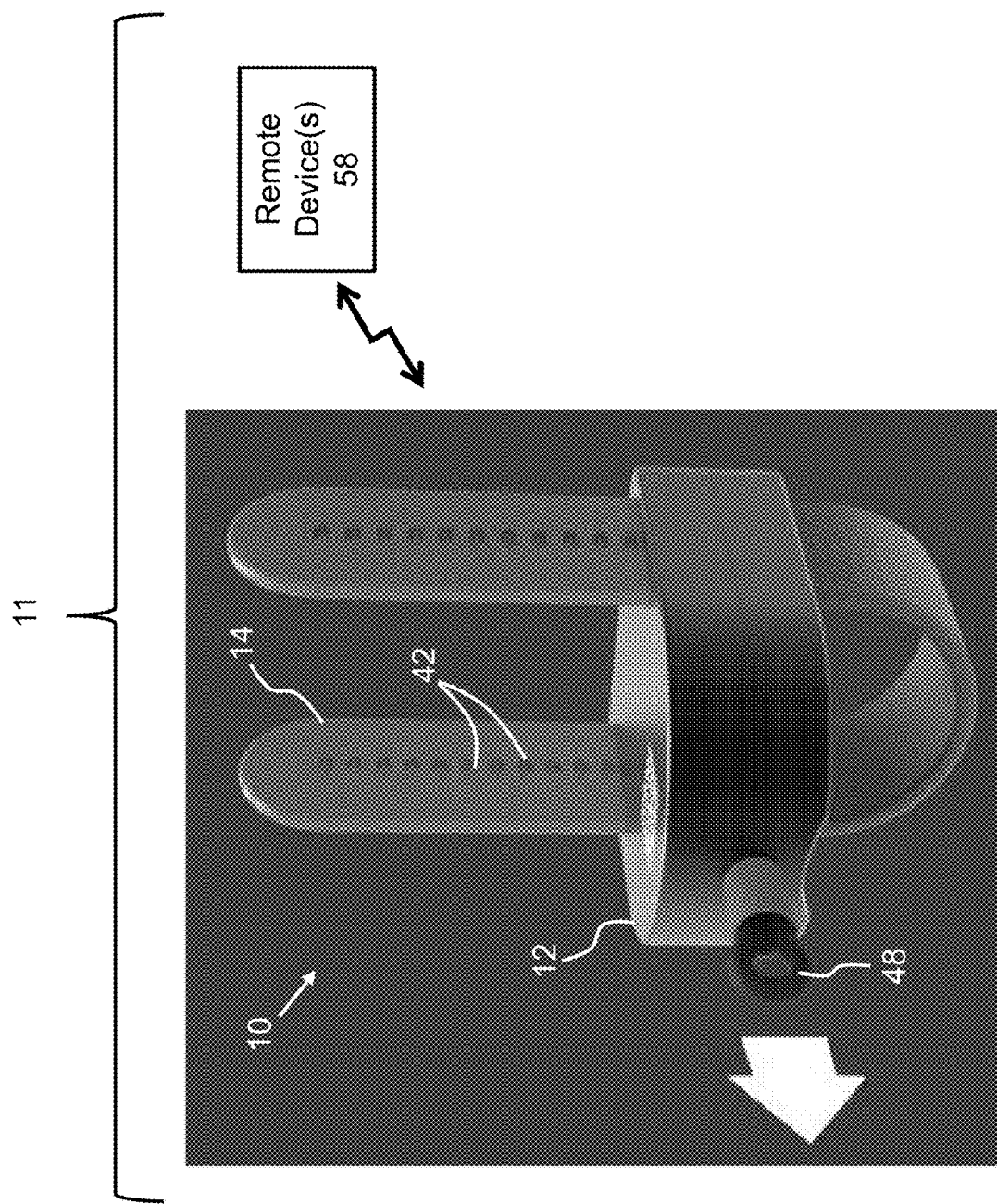
FIG. 1 represents a locking device for securing personal transportation equipment, including a bicycle, in accordance with certain nonlimiting aspects of this invention.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

FIGS. 1 through 14 represent various aspects of a locking device 10 for securing personal transportation equipment, including bicycles, a system 11 that utilizes the locking device 10, and a method of operating a bicycle sharing program with the locking device 10 and system 11 through wireless communications with one or more remote devices 58, as nonlimiting examples, smart phones. Although the locking device 10 is described and illustrated herein with reference to bicycles, the locking device 10 may be used with other transportation equipment, such as manual kick scooters, motorized scooters, skateboards, etc. The locking device 10 and the system 11 combine the convenience of bicycle sharing functionality with the security of a consumer bicycle. The locking device 10 includes adaptable locking components suitable for securing the locking device 10 to various bicycles and securing such bicycles to various other structures, including immobile and relatively immobile structures such as bicycle racks. The locking device 10 and system 11 may allow individual entry into the bicycle sharing market with significantly lower investment relative to existing bicycle sharing programs by allowing the individual to securely share a bicycle whose structure has not been directly modified for the purpose of sharing. Instead, the locking device 10 may be releasably secured to the bicycle to provide bicycle sharing functionality.

Figure 2:
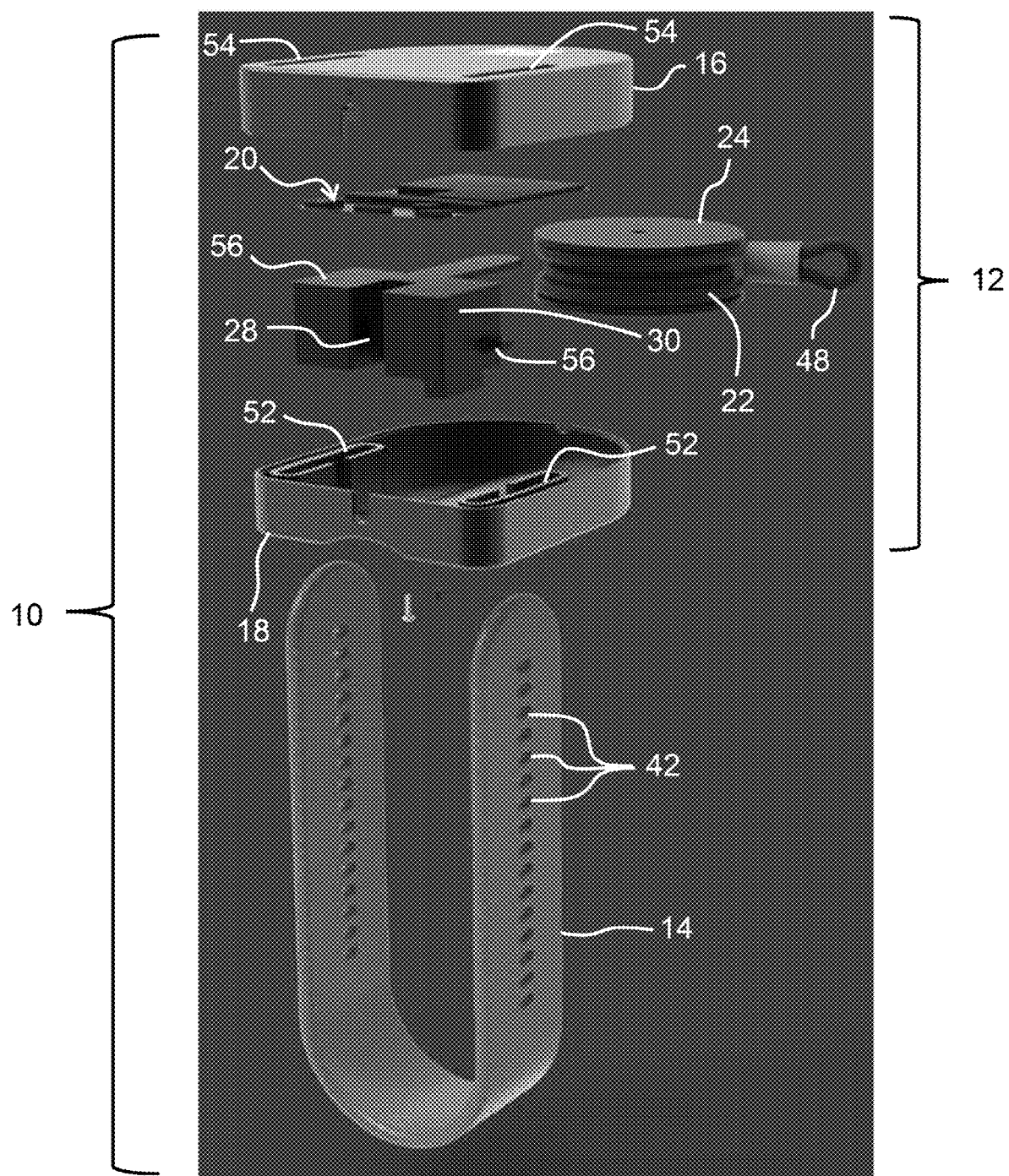
FIG. 2 represents an exploded view of the locking device of FIG. 1.

FIGS. 1 and 2 represent the locking device 10 as including a lock body 12 configured to be secured to a part of a bicycle with a strap 14. The lock body 12 includes two or more body portions 16 and 18 that are fixed to one another and define a hollow, enclosed compartment therebetween. Stored within the compartment, the locking device 10 includes a retractable cable 22, which in the nonlimiting embodiment shown is coiled on a spool of a spring coil mechanism 24 that is coupled to a motorized device 26. FIG. 2 further represents the compartment of the lock body 12 as containing a unit 20 that provides a communication and/or control capability (hereinafter, communication and control unit 20) to the locking device 10 and system 11.

The cable 22 includes a first end 48 that is accessible from an exterior of the lock body 12 and the spring coil mechanism 24 is configured for coiling the cable 22 within the lock body 12 and enabling the cable 22 to be selectively extended from the lock body 12 by pulling on the first end 48 thereof. The motorized device 26 includes a locking mechanism 28 that is configured to releasably secure the first end 48 of the cable 22 to the lock body 12. In the nonlimiting embodiment shown, the lock body 12 includes a hole 50 for inserting a loop at the first end 48 of the cable 22 into the lock body 12. Once inserted into the hole 50, the locking mechanism 28 may secure the loop within the lock body 12. For example, a component (not shown) of the locking mechanism 28 may be inserted into and through the loop to secure the loop within the lock body 12. Such a component may include an elongated member, a hook member, a clamp member, or other member suitable for selectively retaining the loop within the lock body 12.

The motorized device 26 is also represented in FIG. 2 as including a clamping mechanism 30 configured to interact with the strap 14 to releasably clamp the lock body 12 to a part of a bicycle, stabilize the lock body 12 on the part while the bicycle is in use, and release the lock body 12 for removal of the lock body 12 from the bicycle. In the nonlimiting embodiment shown, the strap 14 is formed or elastically deformable to have a U-shape that defines opposite ends 46 that are capable of being inserted into entry slots 52 in the lock body 12, through the lock body 12, and out of exit slots 54 on an opposite side of the lock body 12. The clamping mechanism 30 is configured to interact with portions of the strap 14 located within the compartment to allow and/or restrict the portions of the strap 14 from sliding into or out of the entry and exit slots 52 and 54.

In the embodiment shown in FIGS. 1 and 2, the strap 14 includes two rows of holes 42 spaced apart and aligned along the length of the strap 14. The clamping mechanism 30 includes a pair of protruding members 56 biased outwardly from opposite sides of the motorized device 26 and configured to be received within or otherwise mechanically engage the holes 42 of the strap 14. In combination, the strap 14 and the protruding members 56 of the clamping mechanism 30 operate in a manner such as or similar to a zip tie (cable tie), that is, the ends 46 of the strap 14 may be manually inserted into the entry slots 52, through the lock body 12, and out of the exit slots 54 without being obstructed by the protruding members 56. This may be accomplished by providing beveled, chamfered, or rounded edges on entry slot sides of the protruding members 56 which allow the strap 14 to force the protruding members 56 into the motorized device 26 as the strap 14 is inserted into the lock body 12 and moved in a direction from the entry slot 52 toward the exit slot 54.

During such action, each of the holes 42 pass and receive their respective protruding member 56 but are otherwise not restricted thereby.

In contrast, exit slot sides of the protruding members 56 do not include the beveled, chamfered, or rounded edges and as such once received within respective holes 42 of the strap 14, the protruding members 56 act as barriers that prevent movement of the strap 14 in a direction from the exit slots 54 toward the entry slots 52. To release the strap 14 for movement in the direction from the exit slots 54 toward the entry slots 52, the protruding members 56 may be actuated by the clamping mechanism 30 such that the protruding members 56 are retracted in directions toward the motorized device 26 at least to an extent that the protruding members 56 are removed from their respective holes 42 of the strap 14 so that the protruding members 56 no longer act as barriers to prevent movement of the strap 14.

The communication and control unit 20 may include various components, including but not limited to one or more circuit boards, processors, non-volatile non-transitory memory, volatile memory (e.g., RAM), and network components. Components of the communication and control unit 20 may be operatively coupled by an internal communication bus. The network components may include one or more network transceivers for wired (e.g., ethernet) or wireless (e.g., WAN, Bluetooth, cellular, etc.) connectivity to other devices. The memory may store executable instructions and data such as executable instructions for an operating system and various applications.

Figure 3:
FIG. 3 represents the locking device of FIG. 1 secured to a bicycle in accordance with certain nonlimiting aspects of this invention.

FIG. 3 represents the locking device 10 as secured to a down tube of a frame of a bicycle 60, though the locking device 10 could instead be secured to a top tube (i.e., crossbar), fork, or other member of the bicycle 60. As represented, the lock body 12 is secured to the bicycle 60 with the strap 14. For convenience, the strap 14 will be referred to as including first, second, and third portions, in which the first and second portions of the strap 14 are leg portions of the U-shape of the strap 14 and define the opposite ends 46 that protrude from the exit slots 54 on the opposite side of the lock body 12, while the third portion of the strap 14 is a base portion of the U-shape of the strap 14 and therefore is a midsection of the strap 14 between the ends 46.

Figure 6:
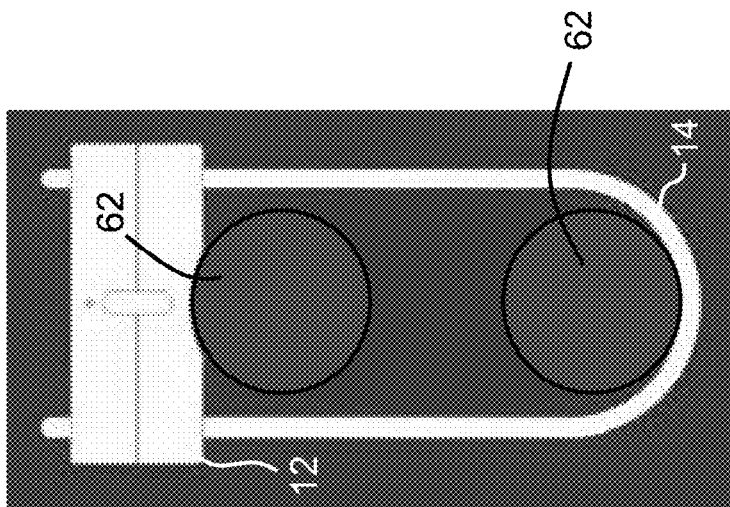
FIGS. 4, 5, and 6 schematically represent cross-sectional views representing the locking device of FIG. 1 clamped to various parts of bicycles requiring allowance for different cross-sectional areas.

The locking device 10 is configured to allow the strap 14 to be selectively inserted into and removed from the lock body 12 such that lengths of the first, second, and third portions are adjustable. This allows the locking device 10 to be clamped to various sizes and shapes of parts of bicycles. For example, FIGS. 4 and 5 each represent the strap 14 surrounding a single individual member 62 of a bicycle so that the locking device 10 is clamped to the individual member 62. As evident, the member 62 represented in FIG. 5 has a larger cross-sectional area than the member 62 represented in FIG. 4. FIG. 6 represents the strap 14 surrounding two individual members 62 of a bicycle so that the locking device 10 is simultaneously clamped to both individual member 62. As represented, adjustment of the strap 14 relative to the lock body 12 allows for increases or decreases of an area defined between the entry slot side of the lock body 12 and the third portion of the strap 14. As such, FIGS. 4 through 6 evidence that the locking device 10 can be secured to various parts of bicycles whose available members for securement vary widely in size (cross-sectional areas), shapes, and numbers.

Figure 5:
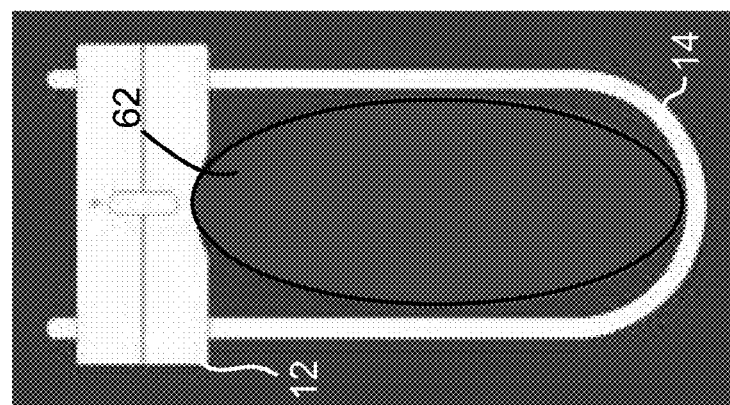
Figure 4:
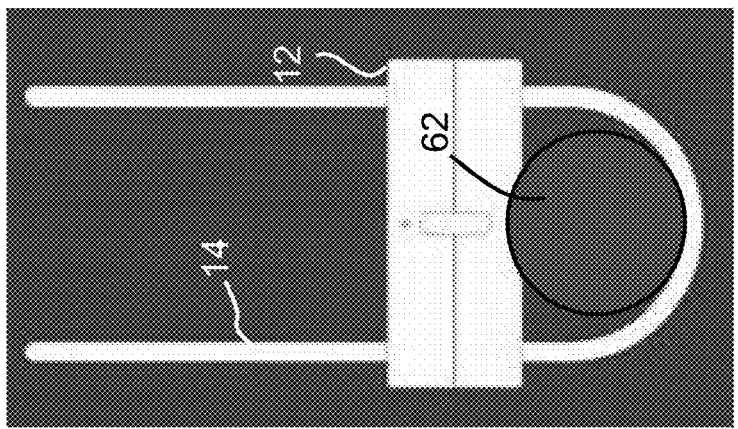

As evident from FIGS. 4 through 6 (and with further reference to FIG. 2), the locking device 10 may be secured to a bicycle by inserting a first of the ends 46 of the strap 14 into a first of the entry slots 52, through the lock body 12, and out of the corresponding exit slot 54. The lock body 12 may be placed adjacent a member 62 of the bicycle and a second of the ends 46 of the strap 14 may be wrapped around the same or other member 62 of the bicycle and inserted into a second of the entry slots 52, through the lock body 12, and out of the corresponding exit slot 54. The first and/or second ends 46 (i.e., first and second leg portions) of the strap 14 may then be pulled in directions away from their respective exit slots 54 and the lock body 12 such that the third (base) portion of the strap 14 tightens about the same/other member 62 until the member(s) 62 is/are clamped between the third (base) portion of the strap 14 and the lock body 12 to firmly secure the lock body 12 to the bicycle.

Once secured to a bicycle, the locking device 10 may be used to secure the bicycle to a separate structure by pulling on the first end 48 of the cable 22 in a direction away from the lock body 12 to uncoil a portion of the cable 22 from the spring coil mechanism 24 within the lock body 12 and extend the portion of the cable 22 from the lock body 12. The portion of the cable 22 extended from the lock body 12 may then be wrapped around the separate structure and then the first end 48 of the cable 22 may be locked to the lock body 12, for example, by inserting the loop of the first end 48 into the hole 50 of the lock body 12 and activating the locking mechanism 28 to secure the first end 48 of the cable 22 therein.

In certain embodiments, communication and control unit 20 of the locking device 10 may include components of a tamper alert system configured to detect unauthorized interaction with the locking device 10 and produce an alert or an alarm in response to detection thereof. For example, the locking device 10 may include sensors configured to sense unauthorized movement of the locking device 10, contact with the lock body 12 or the strap 14, separation of the body portions 16 and 18 of the lock body 12, or other actions that may indicate an individual is attempting to physically interact with the locking device 10 without authorization. Such interactions may include but are not limited to vandalizing the bicycle and/or the locking device 10, removing the locking device 10 to steal the locking device 10 and/or the bicycle, and/or riding the bicycle without permission. In certain embodiments, the tamper alert system may be configured to detect an individual attempting to remotely interact with the communication and control unit 20, software, and/or data of the locking device 10 via a wireless connection.

Figure 8:
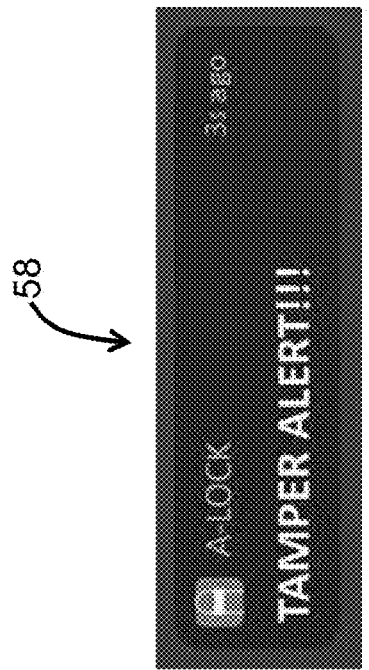
FIG. 8 represents a nonlimiting notification that may be generated by the tamper alert system of the locking device of FIG. 1 and transmitted to a remote device.
Figure 7:
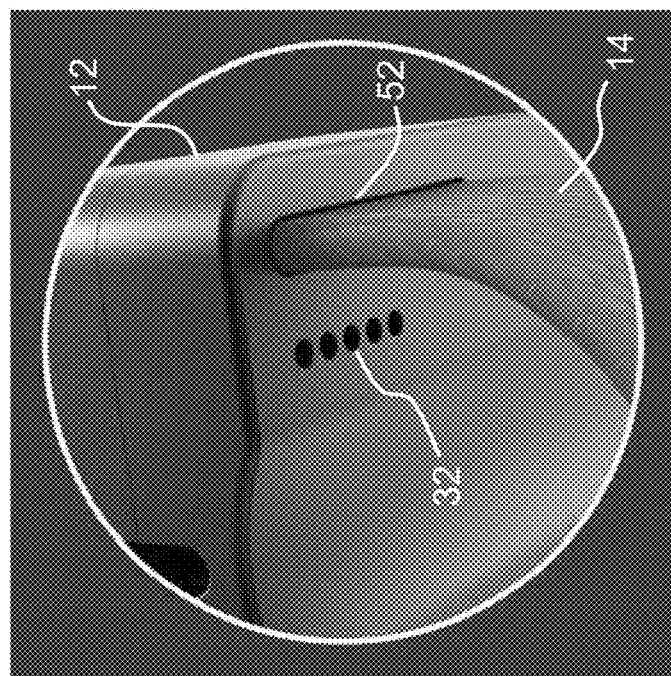
FIG. 7 represents the locking device of FIG. 1 as including a speaker configured to produce an audible alarm in response to a tamper alert system of the locking device detecting unauthorized interaction with the locking device.

In response to detecting unauthorized interaction with the bicycle and/or the locking device 10, the tamper alert system may generate an alarm, alert, or notification. For example, the locking device 10 may include one or more speakers 32 (FIG. 7) and/or light sources (not shown) configured to produce audible or visual alarms, respectively, as instructed by the tamper alert system. As another example, the locking device 10 may be configured to wirelessly communicate an alert or notification to the one or more remote devices 58 as instructed by the tamper alert system. FIG. 8 represents a nonlimiting notification that may be generated by the locking device 10 and transmitted to the remote device 58, such as a mobile phone (e.g., smart phone).

Figure 9:
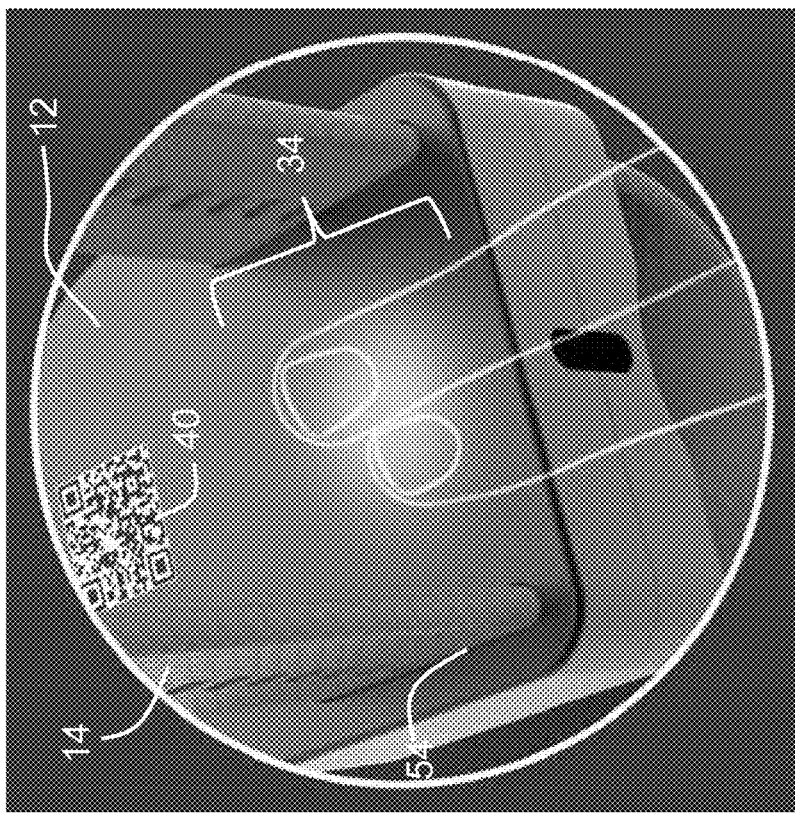
FIG. 9 represents the locking device of FIG. 1 as including a touch sensitive area that is configured to perform a function in response to contact with an authorized user.

In certain embodiments, the communication and control unit 20 of the locking device 10 may include a control interface configured to manually initiate the locking mechanism 28 to unlock the first end 48 of the cable 22 and/or initiate the clamping mechanism 30 to release the strap 14. The control interface may include various components such as but not limited to keypads, combination dials, digital touchscreen displays, biometric sensors, keyed locks, etc. As a nonlimiting example, FIG. 9 represents the lock body 12 of the locking device 10 as including a touch sensitive area 34 that is configured to activate the motorized device 26 in response to contact with an authorized user. For example, the touch sensitive area 34 may be configured to identify one or more fingerprints stored in the memory of the communication and control unit 20.

Figure 10:
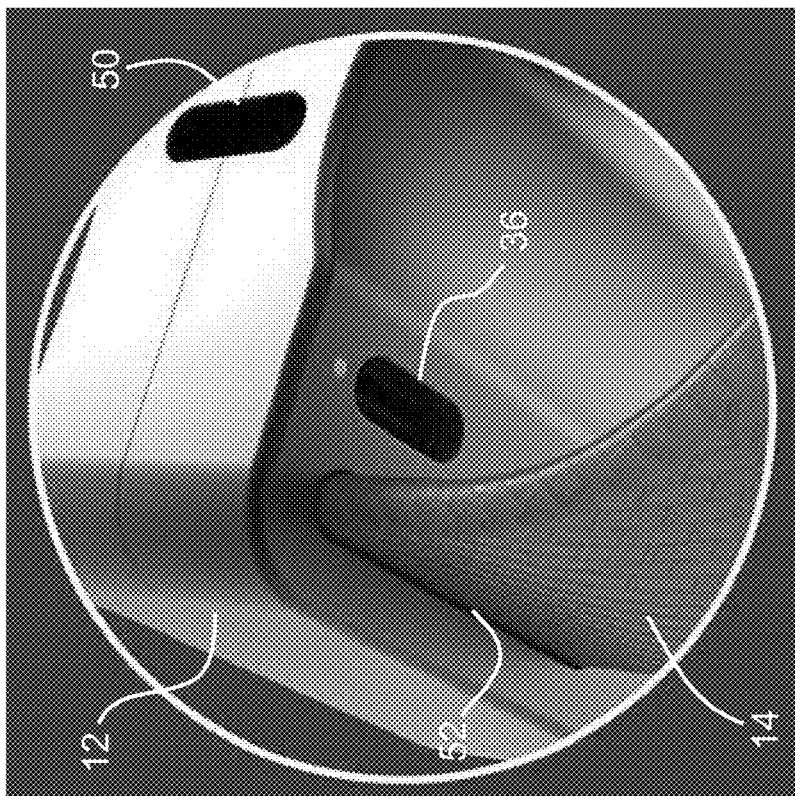
FIG. 10 represents the locking device of FIG. 1 as including a connection point configured for coupling an internal battery pack (not shown) to an external power source for recharging the battery pack.

In certain embodiments, the communication and control unit 20 of the locking device 10 may include a power source, such as a battery or a battery pack, configured to provide sufficient electrical power to the electrical components and the motorized device 26 to operate the locking device 10. FIG. 10 represents the locking device 10 as including a connection point 36 configured for coupling an internal battery pack (not shown) to an external power source and recharging the battery pack. In this instance, the connection point 36 is a USB-C port configured to receive a corresponding USB-C connector of an electrical cable.

Figure 11:
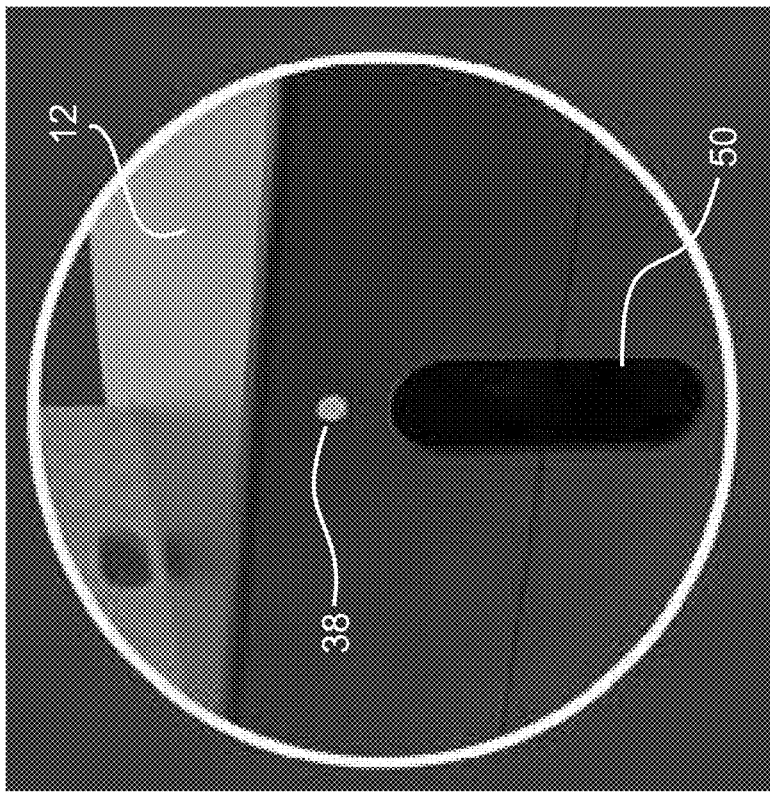
FIG. 11 represents the locking device of FIG. 1 as including a colored light source configured to visually indicate a status of the locking device.

In certain embodiments, the locking device 10 may include an indicator 38 configured to display a status of the locking device 10 that may be generated by the communication and control unit 20. FIG. 11 represents a colored light source located adjacent the hole 50 of the lock body 12 that is configured to visually indicate a status of the locking device 10. For example, the light source may continuously emit a green colored light to indicate that the locking mechanism 28 is in an unlocked position, flash the green colored light to indicate that the locking device 10 and the bicycle are currently available for use, continuously emit a red colored light to indicate that the locking mechanism 28 is in a locked position, and flash the red colored light to indicate that the battery pack is low and needs recharging or replacement.

Figure 12:
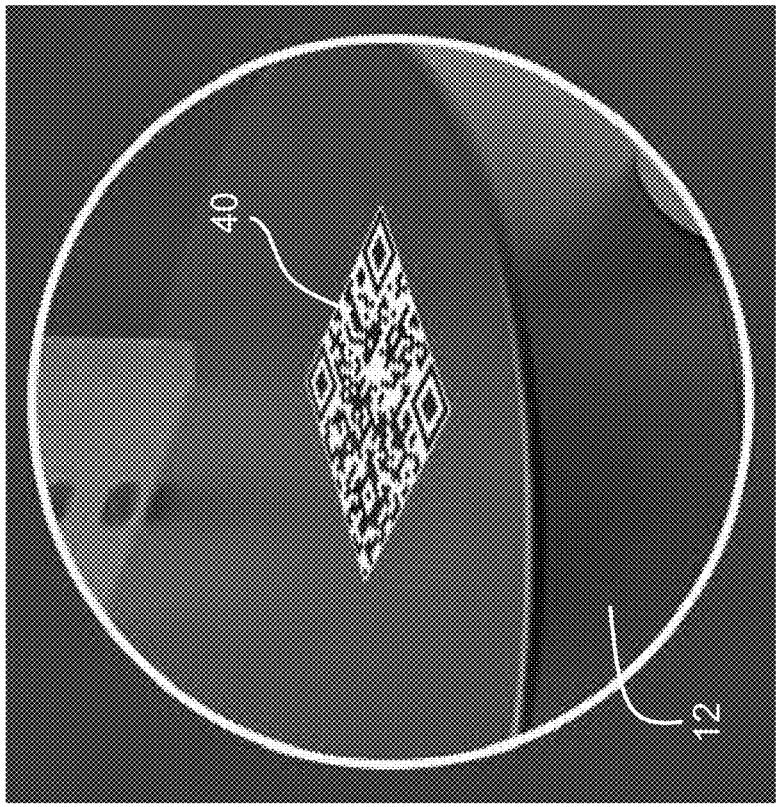
FIG. 12 represents the locking device of FIG. 1 as including a QR code that may be electronically scanned with a device capable of such operation (e.g., smart phone) to identify the locking device.

In certain embodiments, the locking device 10 may include components and/or markings that are configured to provide an identification corresponding to the locking device 10. Such components and/or markings may include but are not limited to serial numbers, bar codes, RFID tags, or other components and/or markings capable of identification of the locking device 10. For example, FIG. 12 represents the locking device 10 as including a QR code 40 that may be electronically scanned with a device capable of such operation (e.g., a smart phone) to identify the locking device 10 and subsequently perform other actions such as but not limited to requesting access to the bicycle, paying for use of the bicycle, and/or ceasing use of the bicycle.

The communication and control unit 20 may be configured to wirelessly communicate with the one or more remote devices 58 to provide bicycle sharing functionality within the system 11. For this purpose, the communication and control unit 20 may include one or more network components capable of wirelessly communicating with at least one remote device 58 to enable the remote device 58 to control certain functions of the locking device 10. For example, the communication and control unit 20 may allow an authorized user of the remote device 58 to wirelessly unlock the first end 48 of the cable 22 from the lock body 12.

In FIG. 1, the locking device 10 is represented as a component of or at least as functioning in combination with the system 11, which may be a network that includes a remote server and one or more software applications that enable the communication and control unit 20 of the locking device 10 to wireless communicate with one or more remote devices 58. For example, the software application may be configured to operate on the remote device 58, communicate with the communication and control unit 20 of the locking device 10 from a geographic location that is remote from the locking device 10, and provide remote bicycle sharing functionality for a bicycle. The software application may be specific to the owner of the locking device 10, or may provide a bicycle sharing program that may incorporate a plurality of bicycles with locking devices 10 thereon. The software application may be configured to operate on various remote devices 58 capable of communication with the communication and control unit 20, such as but not limited to computers, computer tablets, and smart phones.

Figure 13:
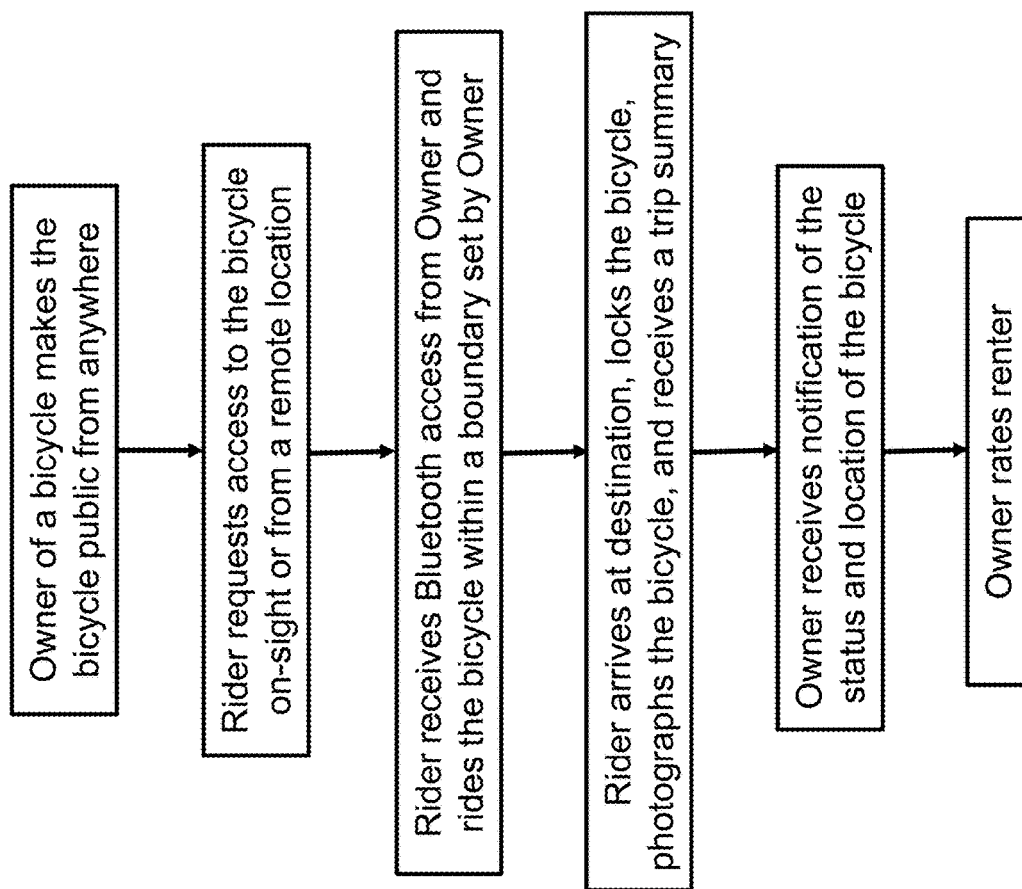
FIG. 13 represents a nonlimiting method of using the locking device of FIG. 1 in combination with a software program as part of a bicycle sharing program.

FIG. 13 represents a nonlimiting method of using the locking device 10 in combination with the software program as part of a bicycle sharing program. In this embodiment, the software application is accessible by a plurality of people who may create user accounts as bicycle owners, bicycle riders, or both. As represented in FIG. 13, a first individual (referred to as "Owner") who owns a bicycle having the locking device 10 thereon may access the software application on a first remote device and use their user account to designate their bicycle as available (referred to in FIG. 13 as "public"). Another individual (referred to as "Rider") who desires to use the bicycle may operate the software application on a second remote device and use their user account to request access to the bicycle. Alternatively, the Rider may be able to request access to the bicycle manually from the control interface of the locking device 10.

The Owner receives the request from the Rider on the first remote device and may either grant or deny use of the bicycle through the software application. In the event that the Owner grants permission to the Rider for use of the bicycle, a wireless signal may be transmitted to the locking device 10 and, in response to receiving the signal, the locking device 10 unlocks the first end 48 of the cable 22 such that the Rider may ride the bicycle. Alternatively, granting of permission by the Owner may allow for wireless communication between the second remote device and the locking device 10 such that the Rider may remotely or manually unlock the cable 22.

The software application may include various other features for both the bicycle owners and the bicycle riders. For example, the software application may provide for real-time location tracking of the locking device 10 during use of the bicycle and continuously or periodically transmitting location data to the remote device of the Owner. This may be accomplished, for example, by incorporating location tracking components into the lock body 12, such as a global positioning system (GPS) receiver and transmitting the locations determined thereby to the first remote device of the Owner. In another embodiment, location tracking may be accomplished by providing wireless communication between the second remote device of the Rider and the locking device 10, obtaining location data from the second remote device with the locking device 10, and then transmitting the location data from the locking device 10 to the first remote device of the Owner. In yet another embodiment, location tracking may be accomplished by transmitting the location data directly from the second remote device of the Rider to the first remote device of the Owner. As indicated in FIG. 13, the software application and location tracking capability of the lock body 12 may be employed to enable the Owner to define a geographic boundary within which their bicycle may be operated by the Rider. In addition to establishing the location of the locking device 10, location tracking may reduce the likelihood of theft.

Once the Rider arrives at a desired destination, the Rider may use the cable 22 to lock the bicycle to a separate structure. At this point, the Rider may remotely indicate with their second remote device or manually with the locking device 10 that the bicycle is no longer in use. Alternatively, the status of the bicycle as no longer being in use may be automatically determined in response to the cable 22 being secured with the locking mechanism 28. As represented in FIG. 13, the Rider may obtain and provide a photograph of the bicycle to show that the bicycle has been secured. If location tracking was performed, a summary of the trip during use of the bicycle may be provided to the Rider and/or the Owner. Once the bicycle is no longer in use, the Owner may receive a notification of the status and location of the bicycle. Optionally, the Owner may receive an indication of the condition of the bicycle (e.g., the photograph). In certain embodiments, the Owner may be able to generate a rating regarding their interaction with the Rider that may be viewable by other users of the software application.

The software application may provide for transmitting and receiving payment for use of the bicycle remotely between the Rider and the Owner. Such payment may be provided at any point prior to, during, or after use of the bicycle. The payment may include various fees such as but not limited to a bicycle rental fee, a fee for using the software application, and/or a fee for any damage caused to the bicycle during use thereof. The Owner and/or the Rider may receive a receipt of the transaction after the payment is complete.

It should be understood that references in the above description of the method to receiving/transmitting information, inputting commands, other otherwise using first and second remote devices are exemplary and do not necessarily indicate that such actions are directly performed on or between the first and second remote devices. Instead, such actions may be performed on or relayed from a remote server accessible by the first remote device, the second remote device, or other devices having access to the software application and/or the remote server. For example, the request by the Rider to use the bicycle may be transmitted to the remote server, rather than directly to the first remote device of the Owner, and associated in the software application with the user account of the Owner. The Owner may then receive a notification from the software application regarding the request or the Owner may access their user account to view the request via a user interface on the first remote device. As such, it should be understood that the software application may be operating on the first remote device, the second remote device, the remote server, or any combination thereof, and the software application may include one or more separate software applications.

Figure 14:
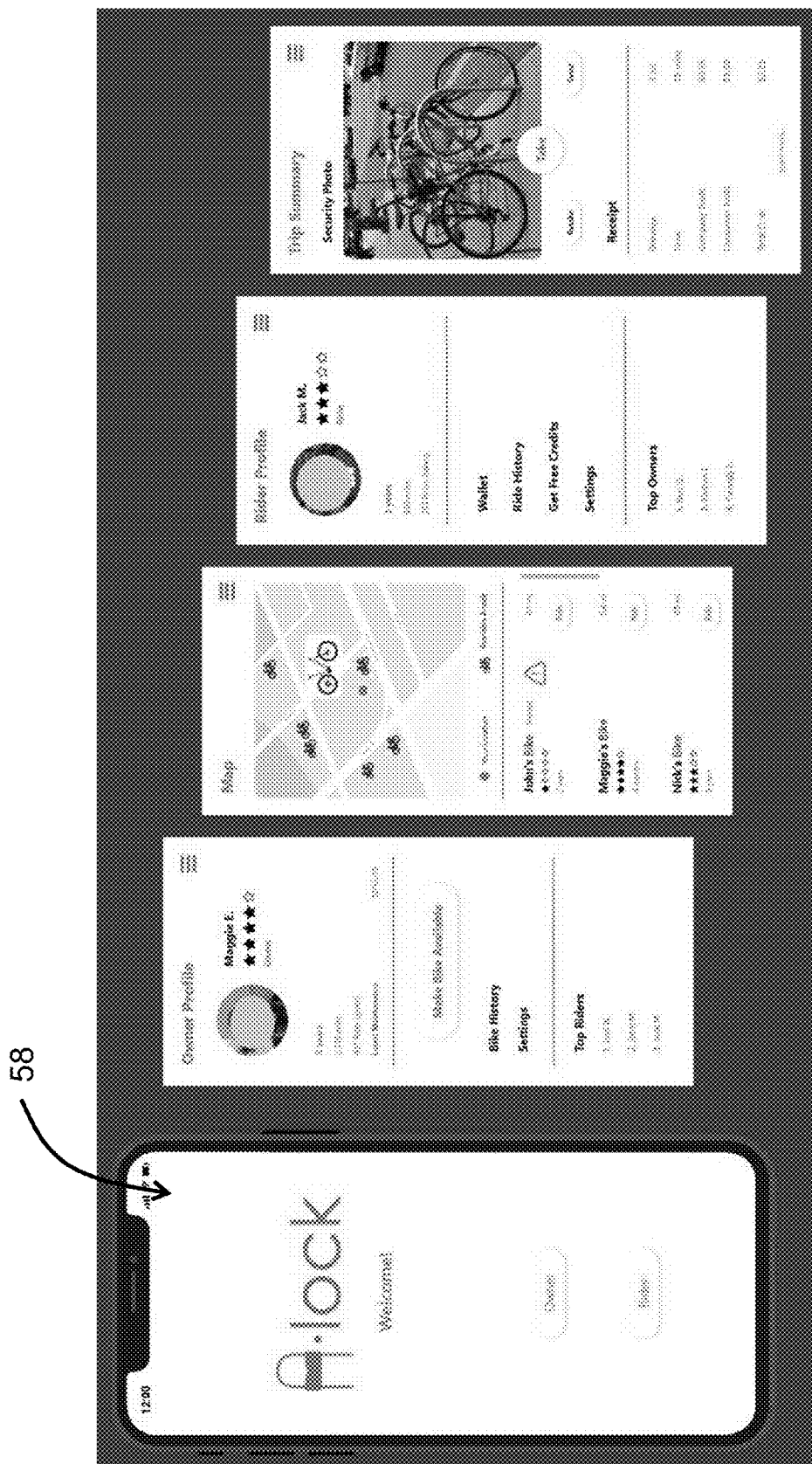
FIG. 14 represents exemplary images of user interfaces during use of the software application, the locking device, and the bicycle.

FIG. 14 represents exemplary images of user interfaces that may be displayed by the software application on a remote device 58 (smart phone) during use of the software application, the locking device 10, and the bicycle. In order from left to right, FIG. 14 depicts a welcome screen, a user account for a bicycle owner, a mapping feature showing nearby bicycles that are available for use, a user account for a bicycle rider, and a security photograph and receipt.

While the invention has been described in terms of specific embodiments, it is apparent that other forms could be adopted by one skilled in the art. For example, the physical configuration of the locking device 10 could differ from that shown, and other equipment and methods could be used other than those noted. In addition, the invention encompasses additional embodiments in which one or more features or aspects of different disclosed embodiments may be combined. Therefore, the scope of the invention is to be limited only by the following claims.

The invention claimed is:

1. A locking device comprising:
    a lock body configured to be secured to a part of a bicycle;
    a cable within the lock body and having a first end accessible from an exterior of the lock body;
    a spring coil mechanism within the lock body for coiling the cable within the lock body and enabling the cable to be selectively extended from the lock body to lock the bicycle to a separate structure by wrapping the cable around the separate structure and then locking the first end of the cable to the lock body;
    a communication and control unit incorporated into the lock body and configured to communicate with a remote device to allow the remote device to wirelessly unlock the first end of the cable from the lock body; and
    a motorized zip tie mechanism incorporated into the lock body to clamp the lock body on the part of the bicycle, stabilize the lock body on the part while the bicycle is in use, and release the lock body for removal of the lock body from the bicycle.

2. The locking device of claim 1, wherein the motorized zip-tie mechanism includes an elongated strap for clamping and stabilizing the lock body to the part of the bicycle such that the part of the bicycle is between the lock body and the strap.

3. The locking device of claim 2, wherein the strap is configured to extend through the lock body such that first and second portions of the strap including opposite ends thereof protrude from a first side of the lock body and a third portion of the strap between the ends protrudes from a second side of the lock body, wherein the third portion is configured to clamp the part of the bicycle against the second side of the lock body, wherein the motorized zip tie mechanism is configured to allow for unrestricted movement of the strap through the lock body in a first direction and restrict movement of the strap through the lock body in a second direction.

4. The locking device of claim 1, further comprising a locking mechanism incorporated into the lock body and configured to releasably secure the first end of the cable to the lock body.

5. The locking device of claim 4, further including a hole for inserting a loop at the first end of the cable into the lock body, wherein the locking mechanism is configured to secure the loop within the lock body.

6. The locking device of claim 4, further comprising a control interface configured to manually unlock the locking mechanism.

7. The locking device of claim 1, further comprising a tamper alert system configured to detect unauthorized interaction with the locking device and produce an alert or an alarm in response to detection thereof.

8. The locking device of claim 1, further comprising a battery pack within the lock body and a connection point configured for coupling the battery pack to a power source and recharging the battery pack.

9. The locking device of claim 1, further comprising an indicator configured to display a status of the lock.

10. The locking device of claim 1, wherein the locking device is a component of a system that further comprises the remote device and a software application configured to operate on the remote device, communicate with the communication and control unit of the locking device, and provide remote bicycle sharing functionality for the bicycle.

11. The locking device of claim 10, wherein the software application provides for receiving a remote request for use of the bicycle and selectively granting or denying use of the bicycle remotely, wherein granting use of the bicycle causes the locking device to unlock the first end of the cable.

12. The locking device of claim 11, wherein the software application provides for generating the remote request through an additional remote device and/or manually from the bicycle.

13. The locking device of claim 10, wherein the software application provides for real-time location tracking of the locking device during use of the bicycle and transmitting location tracking data to the remote device.

14. The locking device of claim 10, wherein the software application provides for transmitting and receiving payment for use of the bicycle remotely.

15. A method of locking a bicycle, the method comprising:
   securing a lock body of a locking device on a part of the bicycle;
   pulling on a first end of a cable accessible from an exterior of the lock body in a direction away from the lock body to uncoil a portion of the cable from a spring coil mechanism within the lock body and extend the portion of the cable from the lock body;
   locking the bicycle to a separate structure by wrapping the cable around the separate structure and then locking the first end of the cable to the lock body; and
   wirelessly unlocking the first end of the cable to unlock the bicycle from the separate structure;
   wherein the lock body is secured to the part of the bicycle by operating a motorized zip tie mechanism incorporated into the lock body to clamp the lock body on the part of the bicycle, stabilize the lock body on the part while the bicycle is in use, and release the lock body for removal of the lock body from the bicycle.

16. The method of claim 15, further comprising:
   receiving a remote request for use of the bicycle; and
   selectively granting or denying use of the bicycle remotely, wherein granting use of the bicycle causes the locking device to unlock the first end of the cable.

17. The method of claim 16, further comprising tracking a location of the locking device during use of the bicycle and transmitting location data to a remote device.

18. The method of claim 16, further comprising receiving payment for use of the bicycle remotely.

* * * * *